No. 712,570. Patented Nov. 4, 1902.
G. F. MYERS.
PLEASURE RAILWAY.
(Application filed July 12, 1902.)
(No Model.) 9 Sheets—Sheet 1.

WITNESSES

INVENTOR

No. 712,570. Patented Nov. 4, 1902.
G. F. MYERS.
PLEASURE RAILWAY.
(Application filed July 12, 1902.)

(No Model.) 9 Sheets—Sheet 2.

Fig. 2.

WITNESSES
INVENTOR
George Francis Myers

THE NORRIS PETERS CO., PHOTO-LITHO., WASHINGTON, D. C.

No. 712,570. Patented Nov. 4, 1902.
G. F. MYERS.
PLEASURE RAILWAY.
(Application filed July 12, 1902.)

(No Model.) 9 Sheets—Sheet 3.

No. 712,570. Patented Nov. 4, 1902.
G. F. MYERS.
PLEASURE RAILWAY.
(Application filed July 12, 1902.)
(No Model.) 9 Sheets—Sheet 4.

WITNESSES
INVENTOR
George Francis Myers.

THE NORRIS PETERS CO., PHOTO-LITHO., WASHINGTON, D. C.

No. 712,570. Patented Nov. 4, 1902.
G. F. MYERS.
PLEASURE RAILWAY.
(Application filed July 12, 1902.)

(No Model.) 9 Sheets—Sheet 5.

WITNESSES   INVENTOR
George Francis Myers.

No. 712,570. Patented Nov. 4, 1902.
G. F. MYERS.
PLEASURE RAILWAY.
(Application filed July 12, 1902.)
(No Model.) 9 Sheets—Sheet 6.

No. 712,570. Patented Nov. 4, 1902.
G. F. MYERS.
PLEASURE RAILWAY.
(Application filed July 12, 1902.)

(No Model.) 9 Sheets—Sheet 7.

WITNESSES
INVENTOR
George Francis Myers

No. 712,570. Patented Nov. 4, 1902.
G. F. MYERS.
PLEASURE RAILWAY.
(Application filed July 12, 1902.)

(No Model.) 9 Sheets—Sheet 9.

WITNESSES
INVENTOR

UNITED STATES PATENT OFFICE.

GEORGE FRANCIS MYERS, OF PITTSBURG, PENNSYLVANIA, ASSIGNOR TO MYERS AMUSEMENT COMPANY, A CORPORATION OF NEW JERSEY.

PLEASURE-RAILWAY.

SPECIFICATION forming part of Letters Patent No. 712,570, dated November 4, 1902.

Application filed July 12, 1902. Serial No. 115,275. (No model.)

*To all whom it may concern:*

Be it known that I, GEORGE FRANCIS MYERS, a citizen of the United States, residing at Pittsburg, county of Allegheny, State of Pennsylvania, have invented certain new and useful Improvements in Pleasure-Railways; and I do hereby declare the following to be a full, clear, and exact description of the invention, such as will enable others skilled in the art to which it appertains to make and use the same.

My invention relates to pleasure-railways, and is particularly designed for the purpose of simulating to the passengers that the car which they occupy is a projectile expelled at high speed by the explosion of gunpowder from the muzzle of a cannon with the accompanying incidents of an ignition, flash, and report. The means for simulating the ignition, flash, and boom or report of a cannon are claimed in my application Serial No. 115,440, and the devices for opening and closing the breech block or door are claimed in my application Serial No. 115,439, both dated July 14, 1902.

In the accompanying drawings, Fig. 13ᵃ represents a detail view of the actuating-cylinder.

Similar numerals of reference indicate similar parts throughout the several views.

Referring to the drawings, 1 indicates a suitable trestle-work provided with inclines 2 3, having tracks 4 5 coöperating with a track 14, which latter track is located within a tunnel formed in the shape of a cannon, made up, preferably, of sections 6 7 8 9 of unequal external diameters, but of uniform bore 17. The cannon-tunnel, as shown, is provided with transverse ribs 24 with intermediate spaces 23 and is supported at its forward end by suitable side braces 16. It is also provided with trunnions 10, resting in suitable trunnion-blocks 11, and at its end 13 is provided with a breech-door 12, which is adapted to be automatically opened on the approach of the car 15. The incline 2 is provided with a car-conveyer chain 20 for bringing the car to the cannon, and the bore of the cannon is provided with a like chain 18, running at a higher speed and stretched upon the sprockets 21 22. The increased or accelerated speed of the chain 18 is conveniently derived from the transfer-chain 19, which transmits motion from the large sprocket 26 upon the shaft of sprocket 27 to the smaller sprocket 25 on the shaft of sprocket 22, the train of transmission chain and sprockets acting as multiplying-gear between the chains 20 and 18.

The door 12, as shown more fully in Figs. 19 to 22, is preferably formed of a hoop-like casing 74, of metal, having inclines 79 registering with the track-rails when the door is closed and having readily-frangible paper sides 75, so that should the door for any reason fail to open on the approach of a car the car would pass through the paper sides and into the cannon without danger to the passengers and without derailment.

Figure 13:
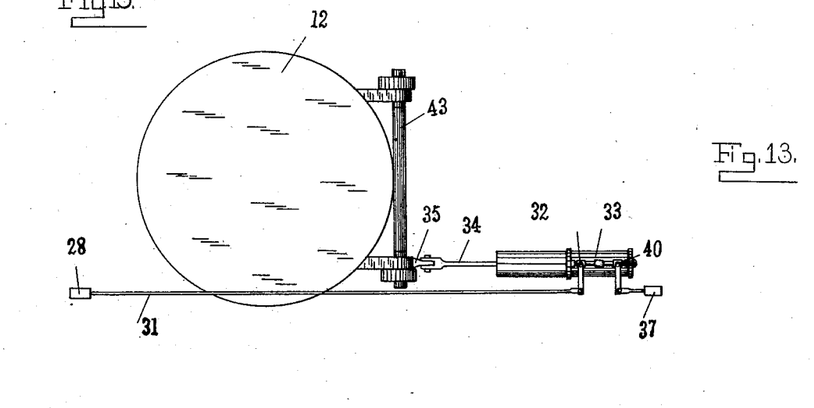
Fig. 13 represents a side elevation thereof.
Figure 14:
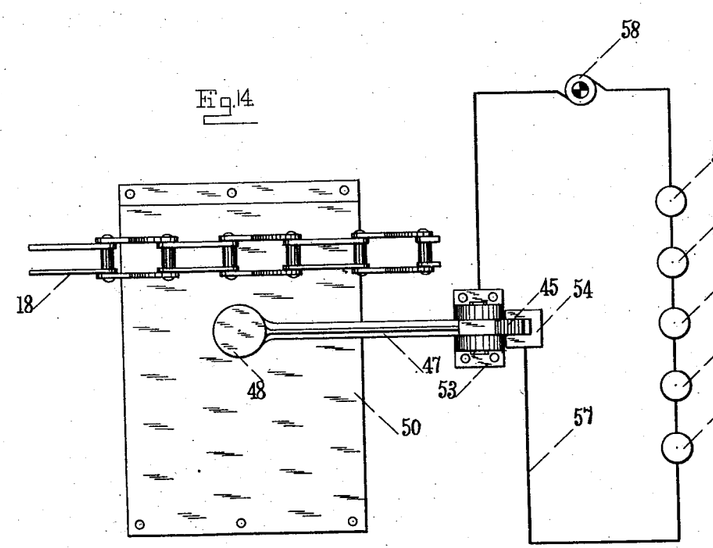
Figs. 14 and 15 represent in plan and elevation the preferred mechanism for producing the simulation of an ignition, flash, and report.
Figure 15:
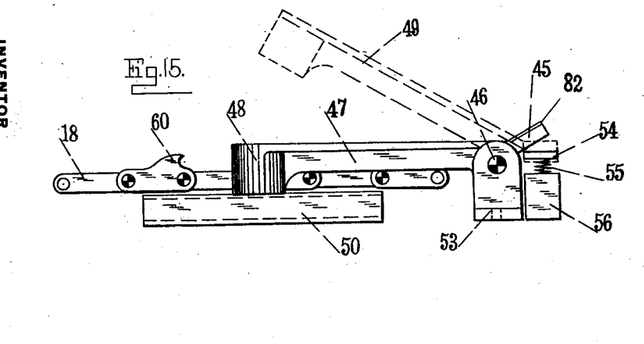
Figure 16:
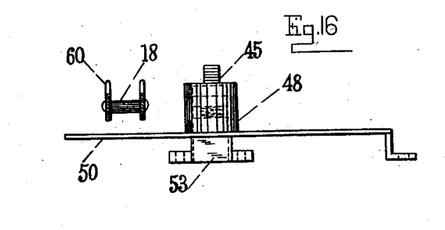
Figs. 16 and 17 represent details thereof and illustrate the relation thereto of the corresponding coöperating projections on the car.
Figure 17:
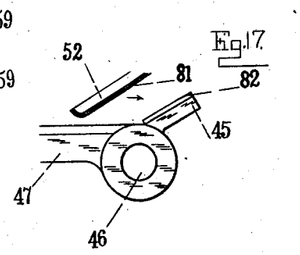

To the casing 74 are attached the brackets 76, perforated for the reception of a pivot 43 (see Fig. 13) and having bases 77, which are bolted to the casing 74 by bolts 78. Integral with the lower bracket 76 is the projection 35, connected by a link 34 with the piston of a fluid-pressure cylinder 33, having pipes at its ends provided with three-way cocks 32 40, with an intermediate supply-pipe leading from the steam-generator or other source of fluid under pressure. The cylinder 33 is normally without steam, the three-way cocks 32 40 normally exhausting both ends of the cylinder. If either cock is actuated to admit steam into the cylinder 33, its neighbor therefore does not interfere with the actuation of the piston.

The cock 32 is connected by a link 31 with a tripping-arm 28, pivoted at 29 and held normally in a position transverse to the trackway by means of a spring 30, which also serves to normally hold the cock 32 in the exhaust adjustment. The tripping-arm 37, pivoted at 39 and provided with the spring 38, in like manner normally holds the cock 40 in the exhaust adjustment.

Figure 1:
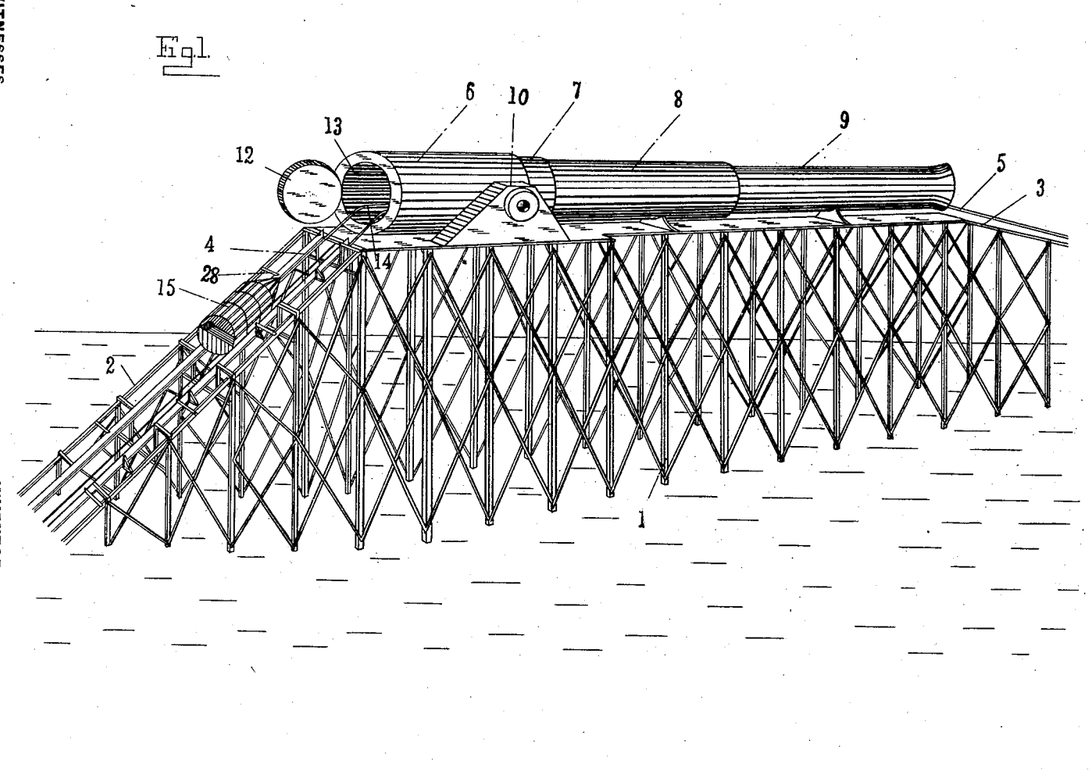
Figure 1 represents a perspective view of apparatus embodying my invention.
Figure 2:
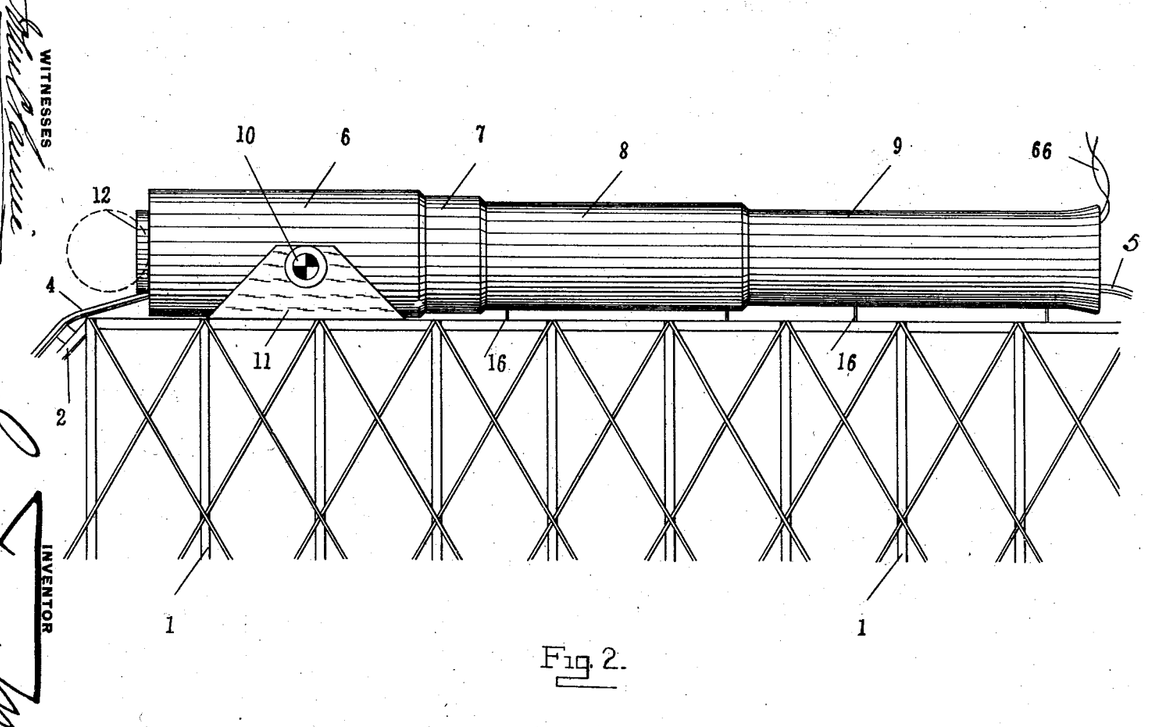
Fig. 2 represents a side view of some of the parts shown in Fig. 1 on a larger scale.
Figure 3:
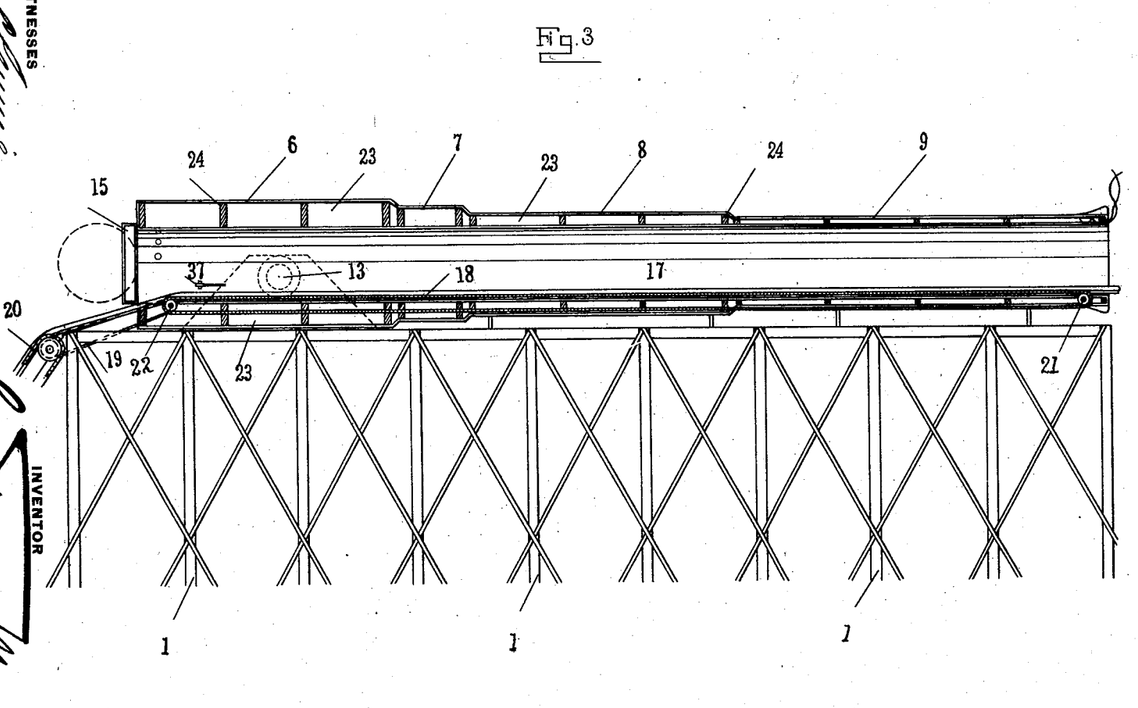
Fig. 3 represents a longitudinal vertical section of the parts shown in Fig. 2.
Figure 4:
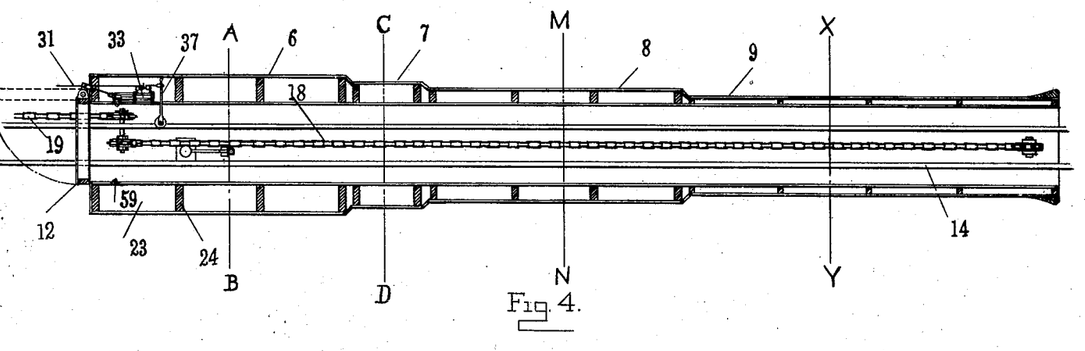
Fig. 4 represents a longitudinal horizontal section thereof.
Figure 5:
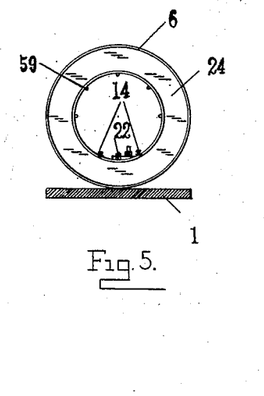
Figs. 5, 6, 7, and 8 represent, respectively, vertical transverse sections on the lines A B, C D, M N, and X Y.
Figure 6:
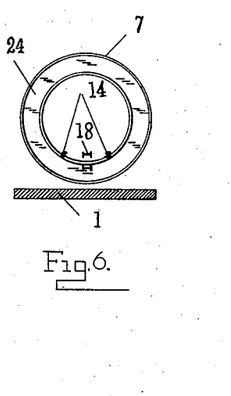
Figure 7:
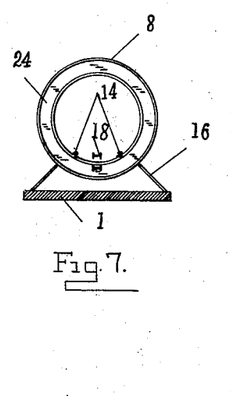
Figure 8:
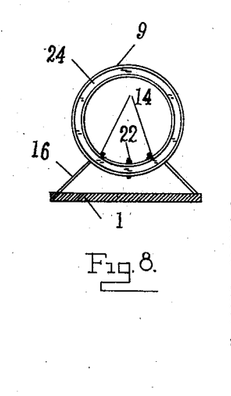
Figure 9:
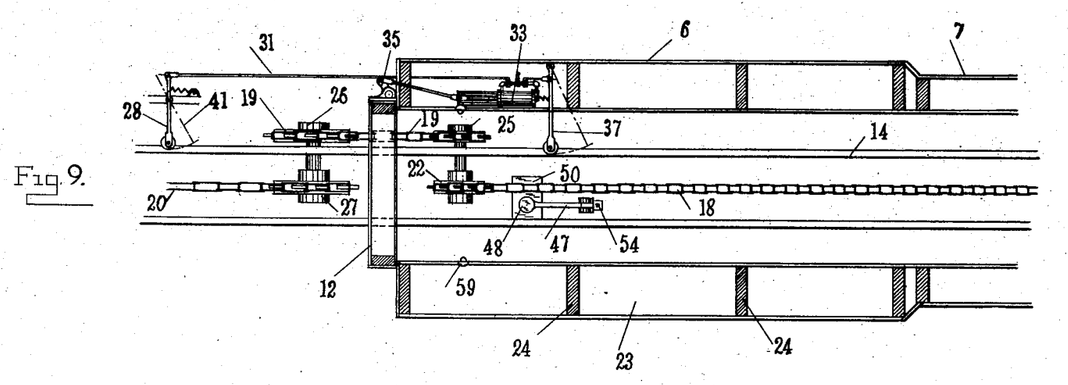
Fig. 9 represents a longitudinal horizontal section, on a larger scale, of the breech portion of the cannon structure and represents the breech as closed.
Figure 10:
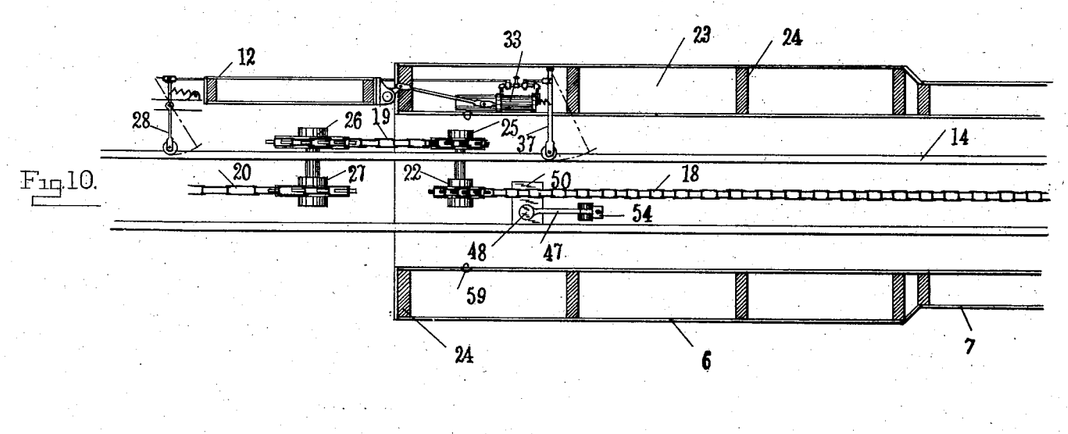
Fig. 10 represents a like view with the breech open for the admission of a car.
Figures 11, 13A:
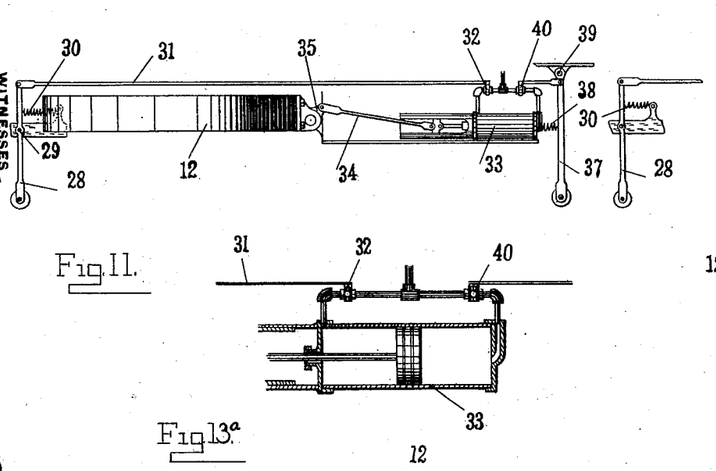
Figs. 11 and 12 represent still larger views of the breech-door opening and closing mechanism.
Figure 12:
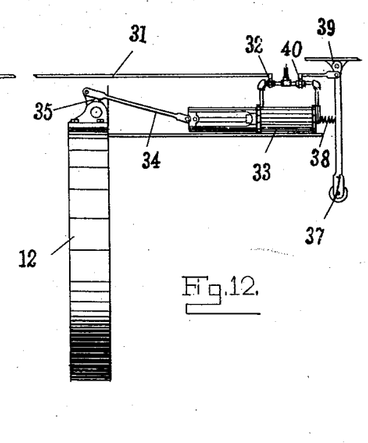

As the car 15 approaches the breech of the cannon-tunnel a projection 44 (see Figs. 23 to 26) strikes the antifriction-roller on the end of the arm 28, deflecting said arm into the position indicated by the dotted line 41 against the tension of the spring 30 and actuating the cock 32 so as to admit steam or other motive fluid into the corresponding end of the cylinder 33. The door 12 is consequently opened into the position shown in Figs. 10 and 11, thereby permitting the car to enter the breech of the cannon-tunnel. As soon as the projection 44 passes and releases the arm 28 said arm 28 is brought back to its normal position by the spring 30, thereby restoring the valve 32 to the exhaust adjustment. In like manner after the car enters the cannon-tunnel the projection 44 actuates the valve 40 through the intermediacy of the arm 37 to close the door 12 and immediately thereafter to restore the valve 40 to the exhaust adjustment.

As the car enters the cannon-tunnel and the door closes behind it the car is released from the chain 20 and is caught by the projection 60 of the accelerating-chain 18, which for that purpose engages with the projection 44, above mentioned. The occupants at once feel the increased and sudden impetus thus imparted to the car, and it is just prior to this moment that the simulation of ignition, flash, and report are timed to take place in rapid succession. To this end in the breech of the cannon is arranged an electric light, preferably in the form of incandescent lamps 59, in a circuit 57, fed from the generator 58. The circuit is normally broken, one of its terminals being the metal block 56, spring 55, and yielding contact 54 and the other terminal being the metal block 53, journal 46, and movable arm 45, the whole constituting a circuit maker and breaker.

Figure 18:
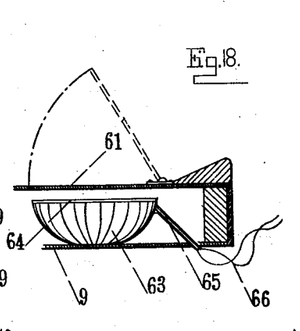
Fig. 18 represents, partly in section and partly in elevation, means for producing smoke at the cannon's muzzle.
Figure 19:
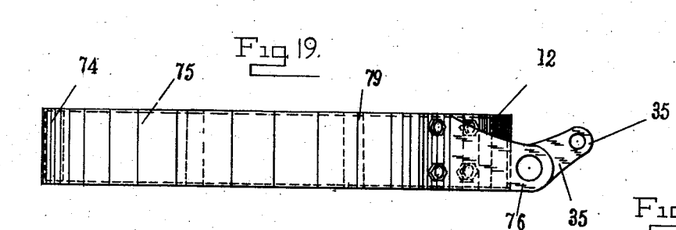
Figs. 19 to 22 represent in top plan, side elevation, end elevation, and section the preferred breech-closing door.
Figure 20:
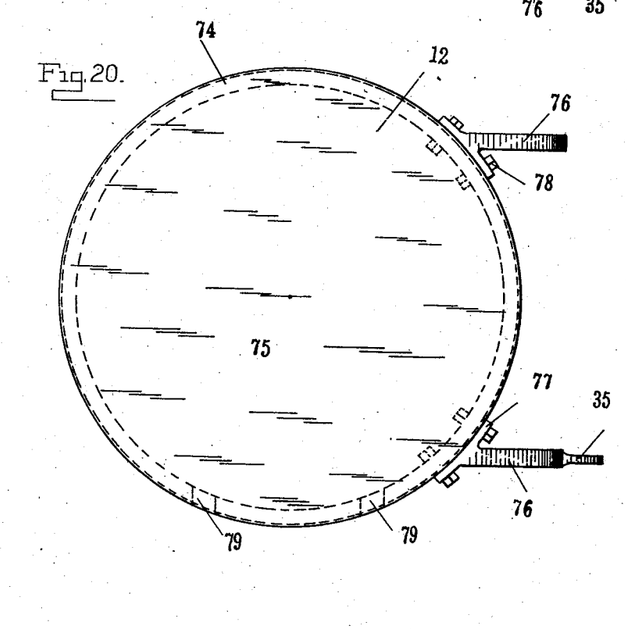
Figure 21:
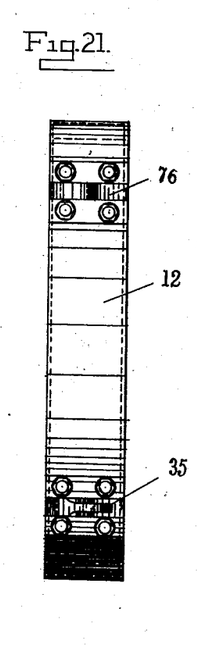
Figure 22:
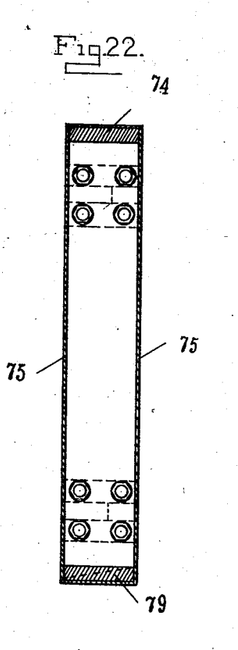
Figure 23:
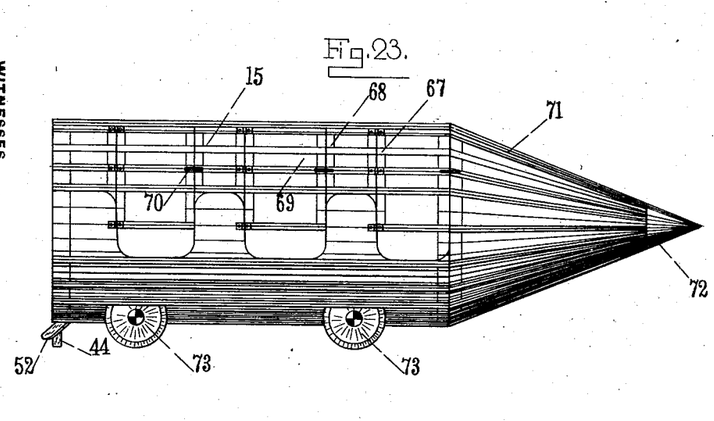
Figs. 23, 24, and 25 represent a side elevation, plan, and end elevation of one form of passenger-car appropriate to the system.
Figure 24:
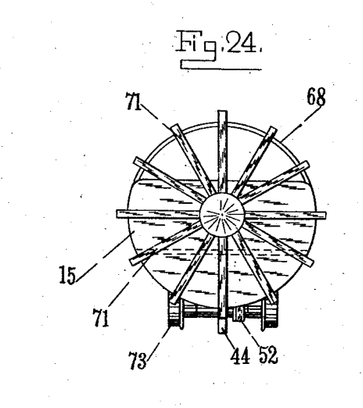
Figure 25:
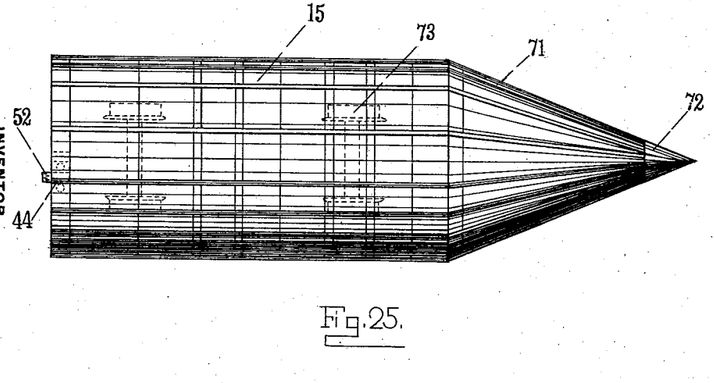
Figure 26:
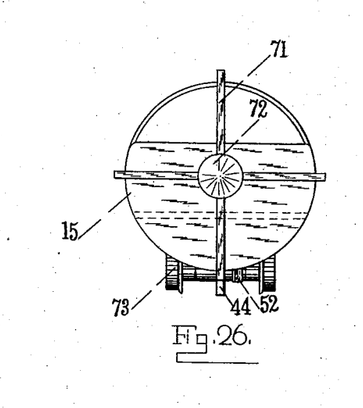
Fig. 26 represents an end elevation of another form or modification of car.

A projection 52 on the car 15 strikes the arm 45 as the car passes into the tunnel, momentarily depressing the arm, completing the circuit through the lamps, and immediately permitting the circuit to be broken, with the resulting impression of a momentary flash. The surface of 52 and of 45 and preferably the surfaces of both are provided with sandpaper 81 82 or the like for the purpose of simultaneously producing a "swish" simulating ignition. Furthermore, by the depression of the arm 45 the longer arm 47 and its hammer end 48 have been brought into the position indicated by the dotted line 49, so that when released the hammer end 48 strikes with violence the sheet-metal gong-plate 50, making a loud report simulating the boom of a cannon. The seizure of the car by the chain 18 and its projection at accelerated speed through the cannon-tunnel immediately follows, giving the passengers the sensation of being projected through the cannon by reason of the simulated explosion they have just heard. The illusion is further reinforced by the burning of gunpowder within the cannon-tunnel and by smoke issuing from the receptacle 63, Fig. 18, adapted to contain any smoke-producing material, which by means of the tube 65 will allow smoke 66 to issue from the mouth of the cannon, simulating more or less the smoke which issues in the ordinary discharge of artillery. For convenience the receptacle 63 may be inserted, removed, or replenished through the flap-door 61.

In so far as the accelerating-chain is concerned, while I have shown it as a single chain extending throughout the bore of the cannon I may make it in sections, each section toward the muzzle end increasing in speed of travel, so as to continuously increase the velocity of the car as it advances toward the cannon's mouth.

In order to further encourage the illusion, I make the car itself in the general shape of a projectile, as shown in Figs. 23 to 26. In order that the passengers may still be in the open air and feel the effects of the wind, the car is provided with an open framework formed of a curved body and arched bents 68, to which are secured the slats 67. Gates 69 may be provided beside each seat and may be hinged, if desired, and fastened by bolts and latches 70. The forward end of the car is preferably made of general conical form, with a steel nose 72 and slats 71. In the form shown in Fig. 26 the car is provided with fewer slats and is easier of ingress and exit.

What I claim is—

1. In a pleasure-railway, a cannon-tunnel, a trackway leading to the breech of the cannon-tunnel, a trackway within the cannon-tunnel bore, a trackway leading from the muzzle end, and means for speeding the passage of a car through the cannon-tunnel bore; substantially as described.

2. In a pleasure-railway, a cannon-tunnel, a trackway, leading to the breech of the cannon-tunnel, means for propelling a car along said trackway, a trackway within the cannon-tunnel bore, and means for propelling a car along said cannon-tunnel-bore trackway, at an accelerated speed, substantially as described.

3. In a pleasure-railway, a cannon-tunnel, a trackway leading to the breech of the cannon-tunnel, a trackway within the cannon-tunnel bore, a trackway leading from the muzzle end, means for speeding the passage of a car through the cannon-tunnel bore, and a movable door at the breech of the cannon-tunnel; substantially as described.

4. In a pleasure-railway, a cannon-tunnel, a trackway leading to the breech of the cannon-tunnel, a trackway within the cannon-tunnel bore, a trackway leading from the muzzle end, means for speeding the passage of a car through the cannon-tunnel bore, and a movable door at the breech of the cannon-tunnel, said door having a readily-frangible paper head; substantially as described.

5. In a pleasure-railway, a cannon-tunnel, a trackway leading to the breech of the cannon-tunnel, a trackway within the cannon-tunnel bore, a trackway leading from the muzzle end, means for speeding the passage of a car through the cannon-tunnel bore, and a movable door at the breech of the cannon-tunnel, said door having a readily-frangible paper head, and having trackway slots or recesses in its casing registering with the rails of the car-trackway; substantially as described.

6. In a pleasure-railway, a cannon-tunnel, a trackway leading to the breech of the cannon-tunnel, a trackway within the cannon-tunnel bore, a trackway leading from the muzzle end, means for speeding the passage of a car through the cannon-tunnel bore, and a smoke-producer located at the muzzle end of the cannon-tunnel; substantially as described.

7. A car for pleasure-railways, having a cylindrical main body portion and a conical forward end and provided with longitudinal slats spaced apart to form an open-work structure; substantially as described.

8. A car for pleasure-railways, having a cylindrical main body portion and a conical forward end and provided with longitudinal slats spaced apart to form an open-work structure, and having arched bents, cross-seats and gates; substantially as described.

In testimony whereof I affix my signature in presence of two witnesses.

GEORGE FRANCIS MYERS.

Witnesses:
B. A. LAWS,
F. DIFFENBACH.